United States Patent
Fukuoka

(10) Patent No.: US 11,301,975 B2
(45) Date of Patent: Apr. 12, 2022

(54) APPARATUS, CONTROL METHOD, AND STORAGE MEDIUM

(71) Applicant: CANON KABUSHIKI KAISHA, Tokyo (JP)

(72) Inventor: Sho Fukuoka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 16/541,510

(22) Filed: Aug. 15, 2019

(65) Prior Publication Data

US 2020/0074606 A1 Mar. 5, 2020

(30) Foreign Application Priority Data

Sep. 3, 2018 (JP) .............................. JP2018-164580

(51) Int. Cl.
| | |
|---|---|
| *G06T 5/50* | (2006.01) |
| *G06T 5/20* | (2006.01) |
| *H04N 1/32* | (2006.01) |
| *H04N 1/387* | (2006.01) |
| *G06T 1/60* | (2006.01) |
| *H04N 1/23* | (2006.01) |
| *H04N 1/191* | (2006.01) |
| *G06F 8/41* | (2018.01) |
| *G06K 15/02* | (2006.01) |

(52) U.S. Cl.
CPC ................. *G06T 5/50* (2013.01); *G06T 1/60* (2013.01); *G06T 5/20* (2013.01); *H04N 1/32454* (2013.01); *H04N 1/3875* (2013.01); *G05B 2219/1159* (2013.01); *G05B 2219/15065* (2013.01); *G06F 8/4434* (2013.01); *G06K 15/1861* (2013.01); *H04N 1/1915* (2013.01); *H04N 1/2338* (2013.01)

(58) Field of Classification Search
CPC .... G06T 5/50; G06T 5/20; G06T 1/60; H04N 1/2338; H04N 1/32454; H04N 19/15; H04N 1/1915; H04N 1/3875; G06K 15/1861; G05B 2219/1159; G05B 2219/15065; G06F 8/4434
USPC ....................................................... 382/254
See application file for complete search history.

(56) References Cited

U.S. PATENT DOCUMENTS

| | | | |
|---|---|---|---|
| 8,274,707 B2 * | 9/2012 | Kosaka | H04N 1/2307 358/3.27 |
| 8,842,325 B2 * | 9/2014 | Achiwa | G06K 15/1817 358/1.16 |
| 9,626,143 B2 * | 4/2017 | Chimura | G06K 15/1856 |

(Continued)

FOREIGN PATENT DOCUMENTS

JP 5147535 B2 2/2013

*Primary Examiner* — Nay A Maung
*Assistant Examiner* — Daniella M. DiGuglielmo
(74) *Attorney, Agent, or Firm* — Canon U.S.A., Inc. IP Division

(57) ABSTRACT

An apparatus including a first memory area and a second memory area is provided with a control method including specifying one or a plurality of types of image processing to be applied in the first memory area, specifying a size of obtainment target image data as a predetermined size based on a memory capacity of the second memory area and a content of the specified one or plurality of types of image processing; and obtaining first divided image data having the specified predetermined size in predetermined image data.

21 Claims, 8 Drawing Sheets

(56) References Cited

U.S. PATENT DOCUMENTS

| | | | | |
|---|---|---|---|---|
| 10,325,189 B2* | 6/2019 | Achiwa | ................ | G06K 15/184 |
| 2007/0269138 A1* | 11/2007 | Eguchi | ...................... | G06T 1/60 |
| | | | | 382/305 |
| 2010/0253694 A1* | 10/2010 | Kambegawa | ............. | G06T 1/60 |
| | | | | 345/557 |
| 2014/0071463 A1* | 3/2014 | Achiwa | ............. | G06K 15/1817 |
| | | | | 358/1.5 |
| 2015/0381852 A1* | 12/2015 | Ito | ........................ | H04N 1/3935 |
| | | | | 358/1.2 |
| 2019/0172208 A1* | 6/2019 | Fukuoka | ................... | G06T 7/11 |

* cited by examiner

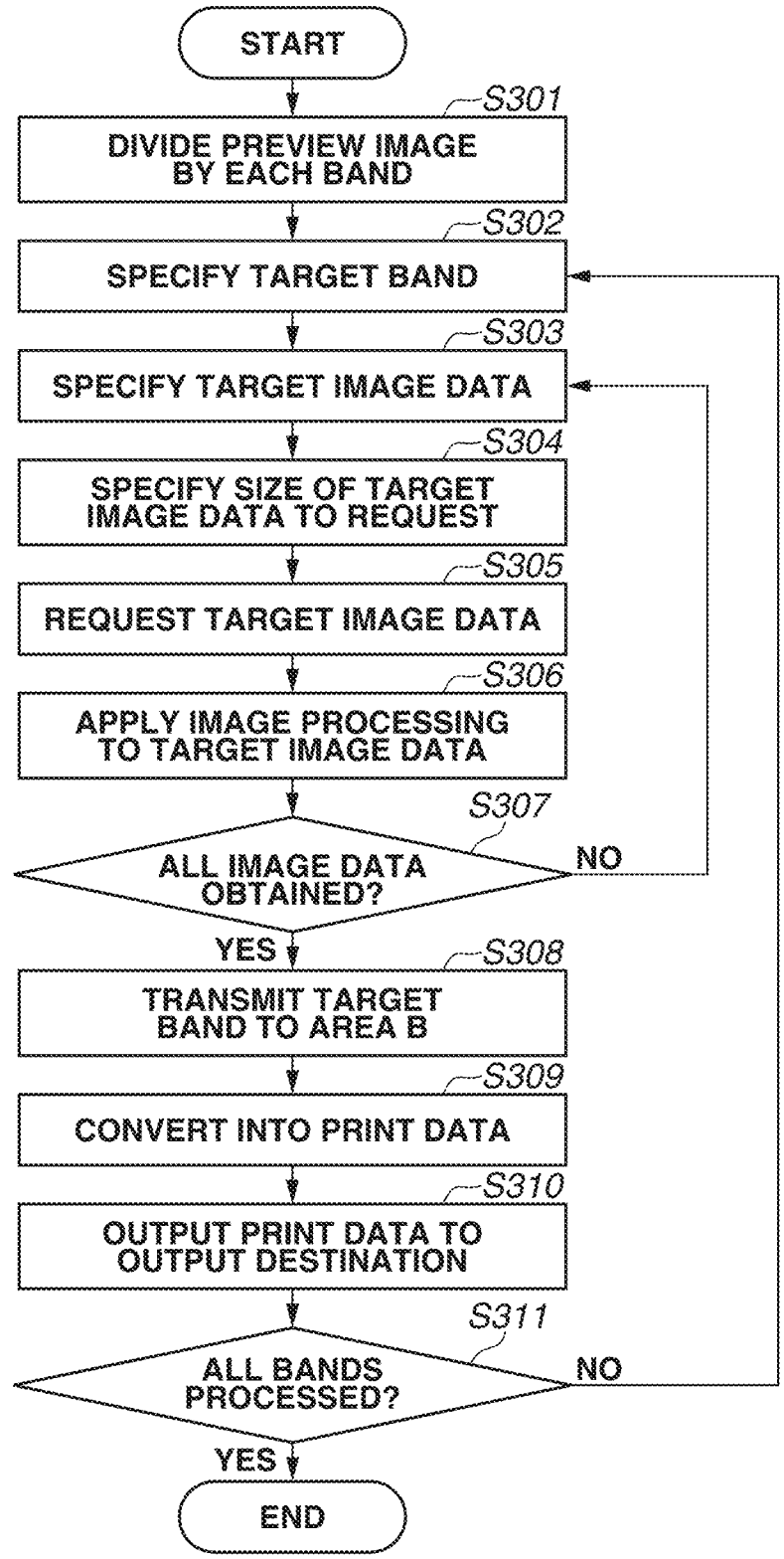

APPARATUS, CONTROL METHOD, AND STORAGE MEDIUM

BACKGROUND OF THE INVENTION

Field of the Invention

The aspect of the embodiments relates to an information processing apparatus, a control method, and a storage medium.

Description of the Related Art

Information processing apparatuses which can perform image processing on image data are known.

Japanese Patent No. 5147535 discusses an apparatus which specifies an extended region used in a plurality of types of image processing based on a print setting for printing an image.

In some cases, image data after being subjected to image processing is stored in a memory area (an area B) different from a memory area (an area A) which is used for execution of the image processing. If a capacity of the image data after being subjected to the image processing is larger than a memory capacity of the area B, the image data after being subjected to the image processing cannot be stored in the area B.

A size of the image data after being subjected to the image processing changes according to a size of the image data before being subjected to the image processing and a content of the image processing. In order to store the image data after being subjected to the image processing in the area B, a size of the image data is controlled before being subjected to the image processing in consideration of the memory capacity of the area B and the content of the image processing. However, such control is not performed in the conventional technique.

Therefore, the aspect of the embodiments is directed to controlling a size of image data before being subjected to image processing in consideration of a memory capacity of an area in which the image data after being subjected to the image processing is stored and a content of the image processing.

SUMMARY OF THE INVENTION

According to the aspect of the embodiments, a method for controlling an information processing apparatus including a first memory area and a second memory area includes specifying one or a plurality of types of image processing to be applied in the first memory area, specifying, based on a memory capacity of the second memory area and a content of the specified one or plurality of types of image processing, a size of obtainment target image data as a predetermined size, obtaining first divided image data having the specified predetermined size in predetermined image data, applying, in the first memory area, the specified one or plurality of types of image processing to the obtained first divided image data, storing the first divided image data applied with the one or plurality of types of image processing in the second memory area, and performing output based on the first divided image data stored in the second memory area.

Further features of the disclosure will become apparent from the following description of exemplary embodiments with reference to the attached drawings.

BRIEF DESCRIPTION OF THE DRAWINGS

FIG. 3 is a flowchart illustrating processing executed by the print application.

DESCRIPTION OF THE EMBODIMENTS

Various exemplary embodiments of the disclosure will be described in detail below with reference to the attached drawings. The exemplary embodiments which will be described below do not restrict the disclosure according to the claims, and all of combinations of features described in the exemplary embodiments are not always essential to the means for solution according to the disclosure.

An information processing apparatus included in an image processing system according to a first exemplary embodiment is described. A personal computer (PC) is described as an example of the information processing apparatus according to the present exemplary embodiment, but the information processing apparatus is not limited to the PC. Various devices such as a mobile terminal, a notebook PC, a tablet terminal, a personal digital assistant (PDA), and a digital camera can be adopted as the information processing apparatus.

Figure 1:
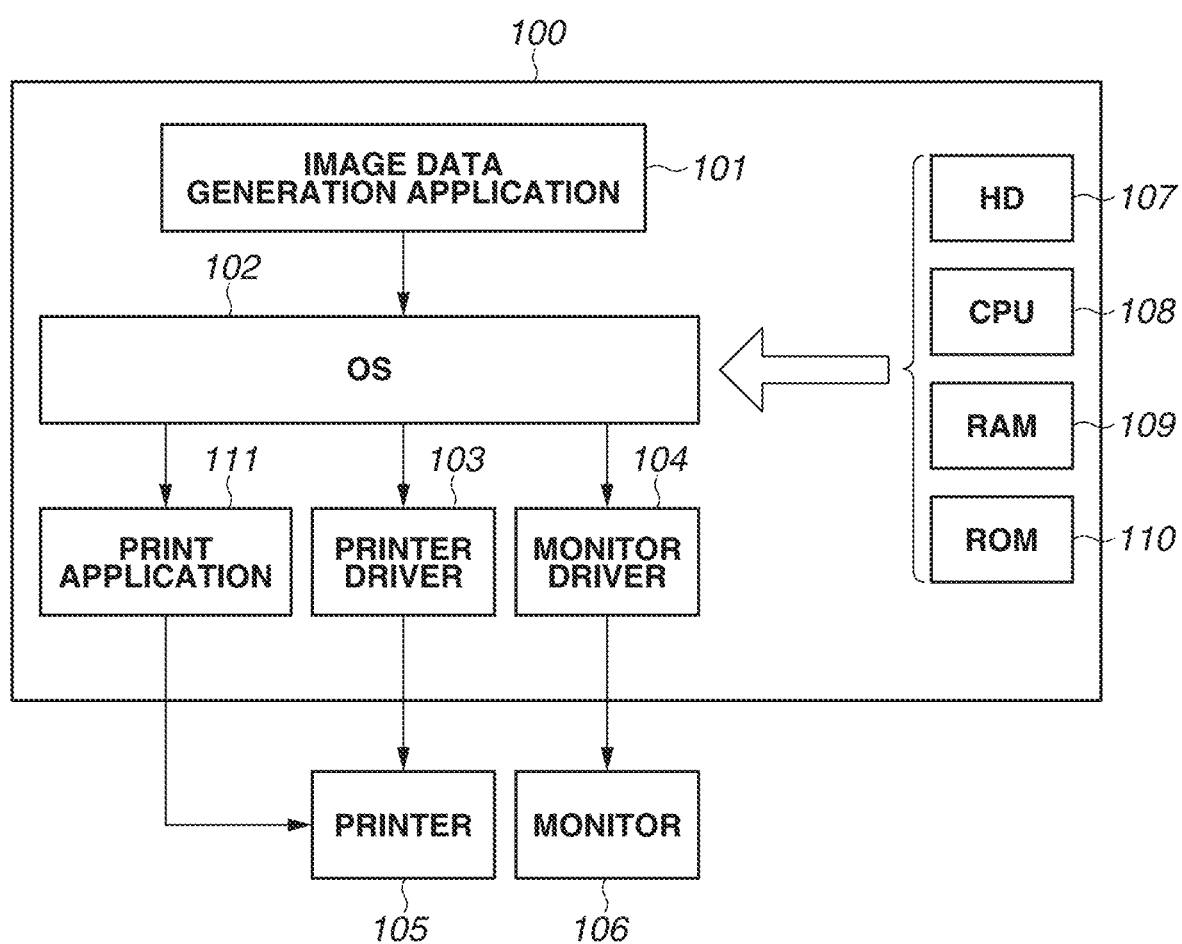
FIG. 1 is a block diagram illustrating a configuration of an information processing apparatus.

A configuration of an information processing apparatus 100 according to the present exemplary embodiment will be described with reference to FIG. 1.

The information processing apparatus 100 includes a hard disk (HD) 107, a central processing unit (CPU) 108, a random access memory (RAM) 109, and a read-only memory (ROM) 110. A computer of the information processing apparatus 100 is formed by the CPU 108, the RAM 109, the ROM 110, and others. The information processing apparatus 100 is connected to a printer 105 as a printing apparatus and a monitor 106 as a display apparatus. According to the present exemplary embodiment, the printer 105 is a printing apparatus which performs printing on a large-sized recording medium using an ink-jet method. However, the printer 105 is not limited to this configuration. For example, the printer 105 may be an apparatus which performs printing using an electrophotographic method, a thermal sublimation method, or other methods, and may be an apparatus which performs printing on a recording medium other than a large-sized recording medium.

The HD 107 is a storage device which stores various types of information.

The CPU 108 comprehensively controls the information processing apparatus 100 by executing an operation system program (hereinbelow, referred to as OS) 102 stored in the ROM 110. Further, the CPU 108 realizes each functional configuration of the information processing apparatus 100 by executing a program stored in the ROM 110, the RAM 109, and the HD 107 and executes calculation and processing of information and control of each hardware. One CPU is illustrated in FIG. 1, but a plurality of CPUs may be included in the information processing apparatus 100 without being limited to the above-described configuration.

The RAM 109 provides a memory for temporarily storing various types of information in execution of a program by the CPU 108.

The ROM 110 stores a program to be executed by the CPU 108 (for example, an album generation application) and an OS.

The information processing apparatus 100 further includes an image data generation application 101, a print application 111, a monitor driver 104, and a printer driver 103 in the memory such as the ROM 110, the RAM 109, and the HD 107. Various rendering processing command groups (an image rendering command, a text rendering command, and a graphics rendering command) indicating an output image to be issued by the image data generation application 101 and the print application 111 are input to the monitor driver 104 via the OS 102. The monitor driver 104 processes these rendering command groups and displays an image on the monitor 106.

According to the present exemplary embodiment, the information processing apparatus 100 employs two methods, namely a method for executing printing using the print application 111 and a method for executing printing using the printer driver 103, as print methods of an image generated by the image data generation application 101. The rendering command group issued by the image data generation application 101 is input to the print application 111 and the printer driver 103 via the OS 102. The print application 111 and the printer driver 103 process the rendering command group and generate print data for causing the printer 105 to execute printing. According to the present exemplary embodiment, a method for executing printing of an image generated by the image data generation application 101 using the print application 111 is described. According to the method, printing is executed by the print application 111 transmitting print data to the printer 105 without using the printer driver 103.

Figure 2A:
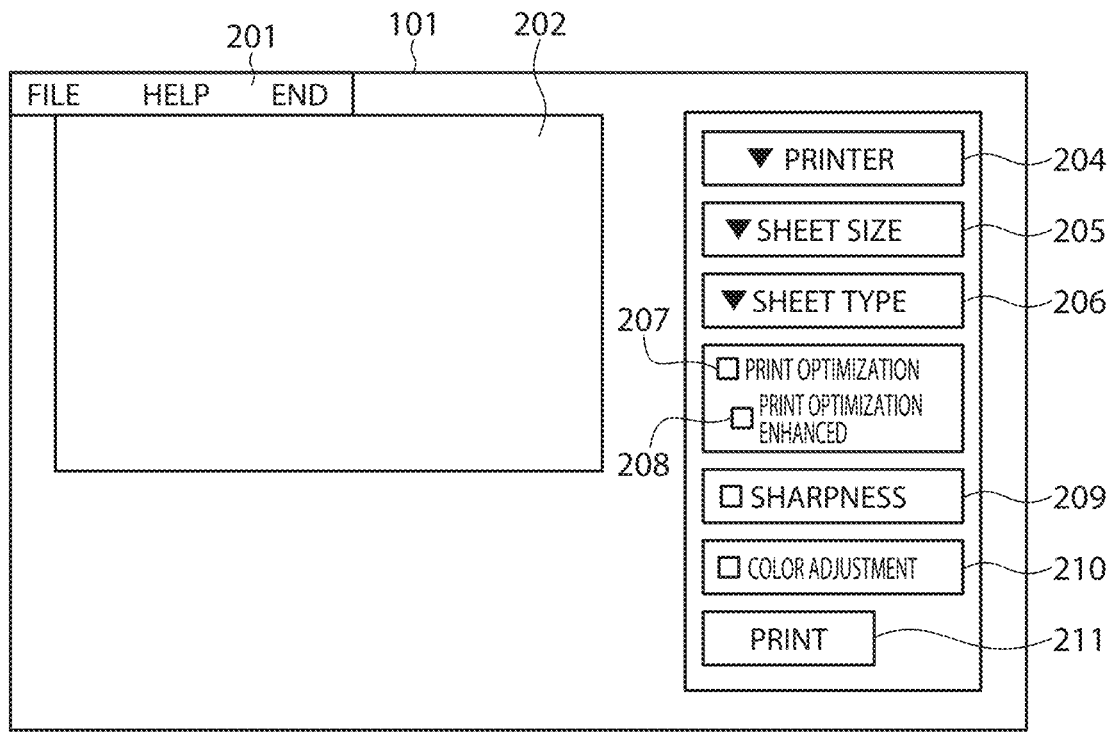
FIGS. 2A and 2B illustrate examples of setting screens displayed by a print application.

FIG. 2A illustrates an example of a setting screen displayed by the print application 111.

A menu operation portion 201 includes a button for ending the print application 111, a button for displaying an operation method (help) of the print application 111, and a button for reading image data from a file. When the button for reading image data from a file is operated, a thumbnail image based on the image data selected by a user from the memory in the information processing apparatus 100 is displayed on a preview area 202.

The thumbnail image based on the image data selected by the user and a thumbnail image based on image data generated by the image data generation application 101 are displayed in the preview area 202. Accordingly, the information processing apparatus 100 can display a preview to the user about what kind of a print product is output by printing based on the image data.

Start-up of the print application 111 can be instructed on a screen displayed by the image data generation application 101, and in this case, a thumbnail image based on image data edited by the image data generation application 101 is displayed in the preview area 202. In a case where start-up of the print application 111 is instructed in a state in which a plurality of pieces of image data is edited by the image data generation application 101, a plurality of thumbnail images based on the plurality of pieces of image data is displayed in the preview area 202. A user can change a position of an image arranged in the preview area 202 by operating the image arranged in the preview area 202. A position of an image in the preview area 202 corresponds to a position of the image on a sheet in a case where the image is printed. In other words, the user can arbitrarily change a position of an image to be printed on a sheet.

A printer selection pull-down 204 is an area for selecting a printer which prints an image corresponding to a thumbnail image displayed in the preview area 202. In a case where a plurality of printers corresponding to the print application 111 is connected to the information processing apparatus 100, the user selects one from the plurality of printers using the printer selection pull-down 204.

A sheet size selection pull-down 205 is an area for selecting a size of a sheet on which the image corresponding to the thumbnail image displayed in the preview area 202 is printed.

A sheet type selection pull-down 206 is an area for selecting a type of a sheet on which the image corresponding to the thumbnail image displayed in the preview area 202 is printed.

A check box 207 is an area for selecting whether to apply print optimization processing to printing of the image corresponding to the thumbnail image displayed in the preview area 202.

A check box 208 is an area for selecting whether to apply print optimization enhanced processing to printing of the image corresponding to the thumbnail image displayed in the preview area 202.

A check box 209 is an area for selecting whether to apply sharpness processing to printing of the image corresponding to the thumbnail image displayed in the preview area 202.

A check box 210 is an area for selecting whether to apply color adjustment processing to printing of the image corresponding to the thumbnail image displayed in the preview area 202.

In a case where image processing is selected to be applied by input to each check box, a thumbnail image expressing an image subjected to the image processing selected to be applied is displayed in the preview area 202. Accordingly, what kind of print result will be obtained can be presented to the user in a case where the image processing is selected to be applied. Types and numbers of the image processing to be applied according to the present exemplary embodiment are not limited to the above-described ones, and any types and numbers of image processing may be applied.

A print button 211 is used for instructing printing of the image corresponding to the thumbnail image displayed in the preview area 202 (in other words, the image corresponding to the image data selected by the user) according to settings of each pull-down and each check box.

Figure 2B:
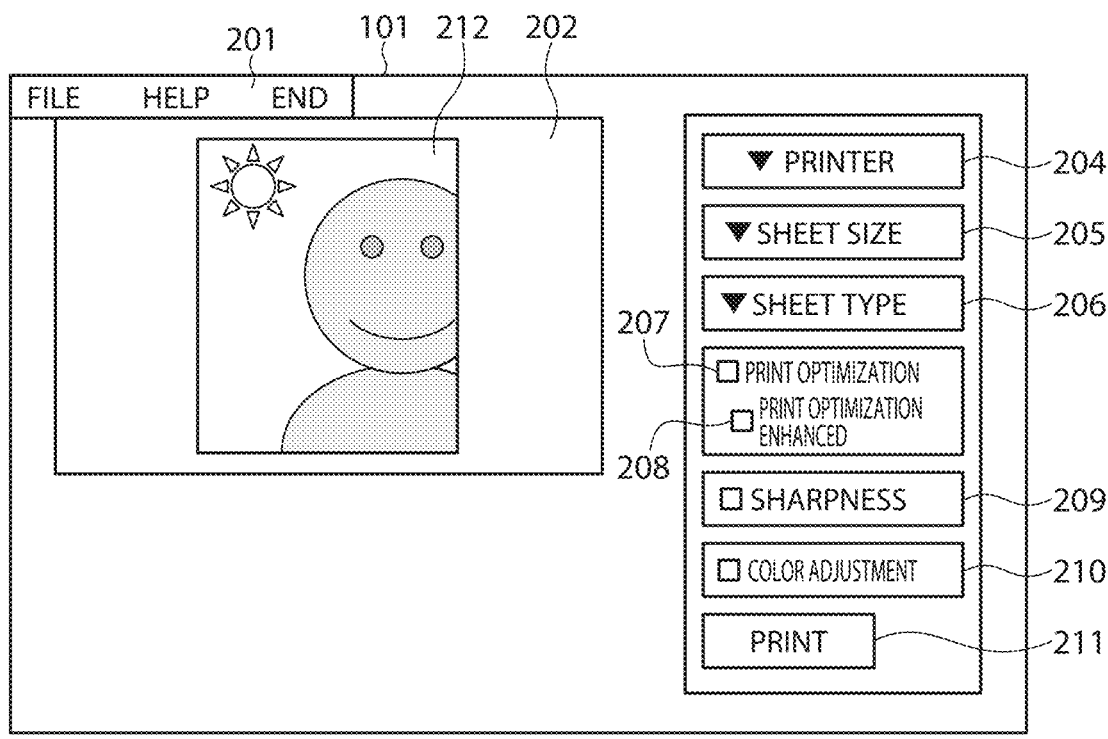

FIG. 2B illustrates an example of a setting screen in a state in which a thumbnail image 212 is displayed in the preview area 202. The screen in FIG. 2B is displayed in a case where image data selected by a user is read as a result of an operation of the button for reading the image data from a file. In this case, the print application 111 obtains information for displaying the thumbnail image 212 based on the image data selected by the user from the OS and thus displays the thumbnail image 212. The screen in FIG. 2B is also displayed in a case where the print application 111 is started via a screen displayed by the image data generation application 101. In this case, the print application 111 obtains information for displaying the thumbnail image 212 based on the image data generated by the image data generation application 101 from the image data generation application 101 and thus displays the thumbnail image 212.

FIG. 2B illustrates a state in which only one thumbnail image is displayed as an example, but a plurality of thumbnail images may be displayed by, for example, being read a plurality of pieces of image data from the image data generation application 101. Further, a user can edit respective positions and sizes of the plurality of thumbnail images on the preview area 202.

In a case where the print button 211 is operated, the print application 111 starts processing for printing the image corresponding to the thumbnail image displayed in the preview area 202 (in other words, the image corresponding to the image data selected by the user). Specifically, the print application 111 stores the image data corresponding to the thumbnail image displayed in the preview area 202 (in other words, the image data selected by the user) in a predetermined memory area (hereinbelow, an area A) in the RAM 109 and performs image processing on the image data. The print application 111 adds image data corresponding to a margin of a sheet to the image data subjected to the image processing and then transmits the image data to a predetermined memory area (hereinbelow, an area B) which is different from the area A in the RAM 109. Further, the print application 111 converts the image data (for example, Joint Photographic Experts Group (JPEG) data) in the area B into print data (raster data) and transmits the print data to the printer 105.

As described above, in a case where the image processing is performed on the image data selected by the user, the print application 111 stores the image data to be a target of the image processing in the area A. However, a memory capacity of the area A (a storable maximum data capacity) is limited. In other words, a size of image data which can be stored in the area A is limited. Therefore, for example, in a case where a size of image data to be a target of the image processing is large, and a data capacity of the image data is large, the entire image data cannot be stored in the area A all at once in some cases. Especially, since the printer 105 according to the present exemplary embodiment performs printing on a large-sized recording medium as described above, the print application 111 is used to handle image data having a large capacity corresponding to an image to be recorded on the large-sized recording medium, and the above-described issue is apt to occur.

Therefore, according to the present exemplary embodiment, the image processing is performed once not on the entire image data selected by the user but on pieces of divided image data obtained by dividing one image data.

In addition, a memory capacity of the area B serving as an area for converting image data into print data is limited. In other words, a size of image data that can be stored in the area B is limited. In one embodiment, a data capacity of image data to be transmitted to the area B is less than or equal to the memory capacity of the area B.

Therefore, according to the present exemplary embodiment, control is performed so that a data capacity of image data to be transmitted to the area B is less than or equal to the memory capacity of the area B.

According to the present exemplary embodiment, the area A and the area B are areas in the same memory. However, the area A and the area B may be areas in different memories without being limited to this configuration.

FIG. 3 is a flowchart illustrating processing executed by the print application 111 in a case where the print button 211 is operated and printing is instructed by a user. Processing in the flowchart illustrated in FIG. 3 is realized by, for example, the CPU 108 reading a program corresponding to the print application 111 stored in the ROM 110 to the RAM 109 and executing the program. The processing in the flowchart illustrated in FIG. 3 is started when the print button 211 is pressed.

According to the present exemplary embodiment, the memory capacity of the area B is limited, and thus entire image data corresponding to an image displayed in the preview area 202 and subjected to the image processing in the area A may not be collectively processed in the area B in some cases. Therefore, the image data corresponding to the image displayed in the preview area 202 is processed by each band in the area B. Specifically, the entire image data corresponding to the image displayed in the preview area 202 is divided into each image data fitting within the memory capacity of the area B and processed in the area B.

Therefore, in step S301, the CPU 108 specifies a height of the band corresponding to a data capacity fitting within the memory capacity of the area B. Specifically, first, the CPU 108 specifies print resolution in printing of the image corresponding to the image data selected by the user based on a size and a type of a sheet to be used for printing and quality of printing. This is because, the size of the band corresponding to the data capacity fitting within the memory capacity of the area B depends on not only the memory capacity of the area B but also the print resolution. Next, the CPU 108 specifies the height of the band (unit: pixel) based on the memory capacity of the area B, a width of a print target recording medium, the specified print resolution, and a capacity of each pixel. In other words, a band having a height less than that specified in step S301 can be collectively processed in the area B.

Figure 8A:
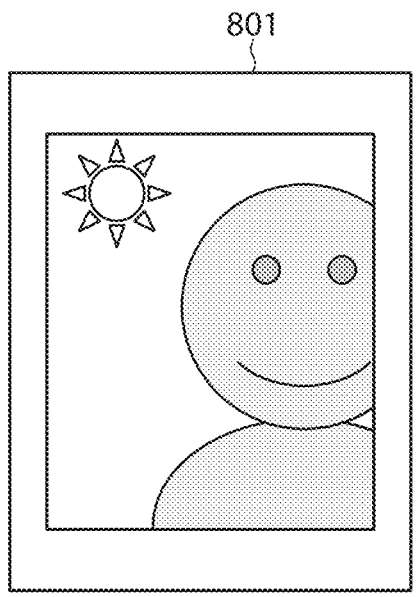
FIGS. 8A to 8C illustrate entire image data corresponding to an image displayed in a preview area.
Figure 8B:
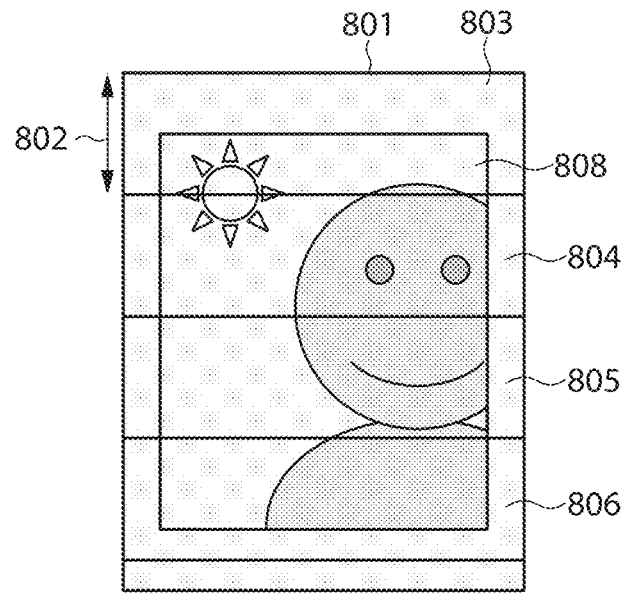
Figure 8C:
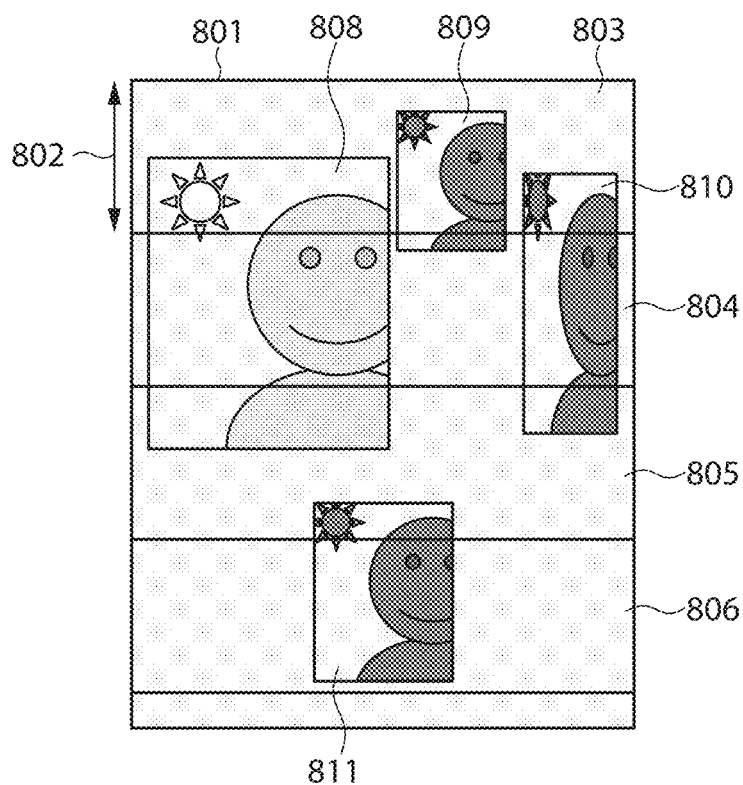

Next, in step S302, the CPU 108 specifies a band to be a processing target (hereinbelow, a target band) out of the entire image data corresponding to the image displayed in the preview area 202. The present processing will be specifically described. For example, suppose that image data 801 illustrated in FIG. 8A is the image data corresponding to the entire image displayed in the preview area 202. As illustrated in FIG. 8A, the entire image data displayed in the preview area 202 includes not only image data corresponding to a thumbnail image but also image data corresponding to a margin (a margin area). The image data 801 can be divided into bands having a height 802 specified in step S301 as illustrated in FIG. 8B. In a case where the image data 801 includes a plurality of images, the image data 801 is as illustrated in FIG. 8C. The CPU 108 specifies a band 803 having the height 802 specified in step S301 in the image data 801. In a case where processing with respect to the band 803 is completed, and the processing in step S302 is executed again, subsequent bands (804 to 806) are specified in turn.

Next, in step S303, the CPU 108 specifies image data (target image data) which is not obtained yet in the image data included in the target band. The target image data is, for example, image data 808 in FIG. 8B. In a case where a piece of image data extends across a plurality of bands, the CPU 108 obtains the piece of image data by dividing the image data for each band and performs image processing thereon. In a case where the target band (the band 803 in this case) includes a plurality of pieces of image data as illustrated in FIG. 8C, and the processing in step S303 is executed again after the processing on the image data 808 is completed, the CPU 108 specifies next image data (809 and 810) in turn.

Next, in step S304, the CPU 108 specifies a size of the target image data (the target image data to be obtained) to request from an image data supply source. In a case where the print application 111 is started up in cooperation with the image data generation application 101, and image data generated by the image data generation application 101 is to be printed, the image data supply source is the image data generation application 101. On the other hand, in a case where the print application 111 is independently started up, and printing is performed after reading image data stored in any memory, the image data supply source is the OS. The present processing is described in detail below with reference to FIG. 4.

In step S305, the CPU 108 requests the target image data having the size specified in step S304 from the image data supply source. Specifically, in a case where the CPU 108 requests image data having a size including a marginal area, the CPU 108 requests the image data from the image data supply source so that the marginal area will be image data outside the target band. Accordingly, the CPU 108 obtains the target image data including the image in the target band and stores the target image data in the area A.

In step S306, the CPU 108 applies image processing specified to be executed in below-described step S401 to the image data obtained in step S305. If there is a marginal area which is not included in the image data obtained in step S305, the CPU 108 adds the marginal area to the image data obtained in step S305 and then applies the image processing to the image data.

In step S307, the CPU 108 determines whether all pieces of the image data corresponding to the image included in the target band are obtained. If determined YES in step S307, the CPU 108 advances the processing to step S308, and if determined NO in step S307, the CPU 108 returns the processing to step S303 and newly specifies the target image data.

In step S308, the CPU 108 adds image data corresponding to a margin portion of the print target recording medium to each image data subjected to the image processing. Accordingly, the image data corresponding to the target band is generated. The CPU 108 transmits the image data to the area B (data transmission processing). Subsequently, the CPU 108 deletes the transmitted image data from the area A.

In step S309, the CPU 108 converts the image data in the area B into print data.

In step S310, the CPU 108 outputs the print data in the area B to an output destination. Specifically, the CPU 108 transmits the print data in the area B to the printer 105 selected using the printer selection pull-down 204. The printer 105 does not start printing immediately after receiving a piece of the print data but starts printing based on the received print data after receiving the print data of all bands. Subsequently, the CPU 108 deletes the output print data from the area B.

In step S311, the CPU 108 determines whether all bands are processed as the target bands. If determined YES in step S311, the CPU 108 terminates the processing, and If determined NO in step S311, the CPU 108 returns the processing to step S302 and newly specifies the target image data.

Figure 4:
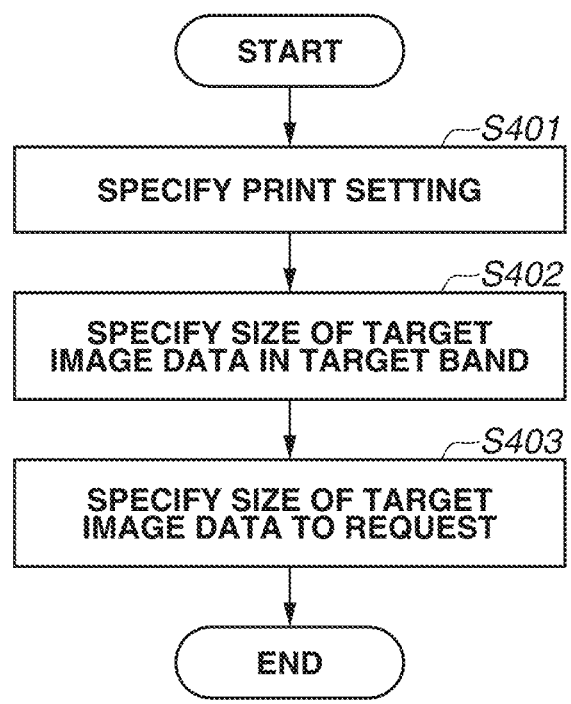
FIG. 4 is a flowchart illustrating processing for specifying a size of target image data to be requested to an image data supply source.

FIG. 4 is a flowchart illustrating processing for specifying a size of the target image data to be requested to the image data supply source. Processing in the flowchart illustrated in FIG. 4 is realized by, for example, the CPU 108 reading a program corresponding to the print application 111 stored in the ROM 110 to the RAM 109 and executing the program. The processing in the flowchart illustrated in FIG. 4 corresponds to the processing in step S304.

In step S401, the CPU 108 specifies a print setting for printing of the image corresponding to the image data (the image data selected by the user) obtained from the image data supply source based on input to the setting screens illustrated in FIGS. 2A and 2B. Specifically, the CPU 108 specifies a printer which executes printing (the printer 105 in this case) and a size and a type of a sheet to be used for printing based on input to each pull-down. Further, the CPU 108 specifies a type of image processing to be applied to the image data obtained from the image data supply source based on input to each check box. A method for specifying the type of image processing is described in detail below with reference to FIG. 5.

In step S402, the CPU 108 specifies a size of the target image data in the target band. The size of the target band corresponds to a size of the image data to be transmitted to the area B, namely a size of the image data subjected to the image processing. Therefore, the size of the target image data in the target band is the size of the target image data after being subjected to the image processing. Since the size of the target band is specified in step S301, the size of the target image data in the target band is specified based on information about a position at which the image corresponding to the target image data is printed and the like.

In step S403, the CPU 108 specifies the size of the target image data that is to be requested to the image data supply source in order to obtain the target image data having the size specified in step S402 after applying the image processing thereto. In other words, the CPU 108 specifies the size of the target image data in the target band before being subjected to the image processing. Detail processing will be described below.

Figure 6A:
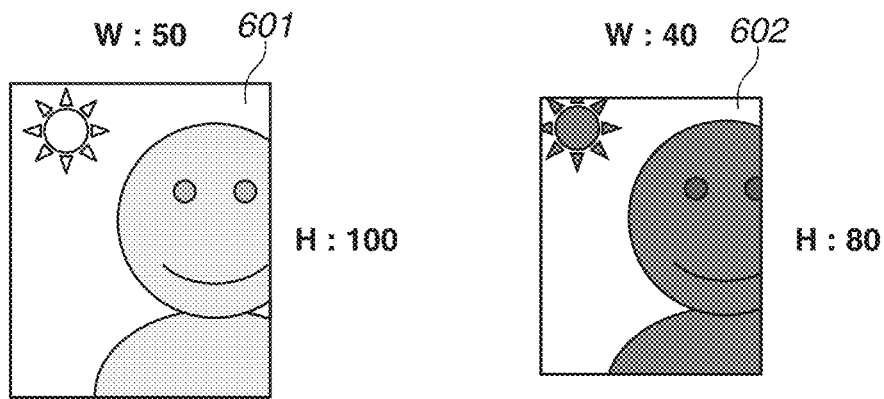
FIGS. 6A and 6B illustrate a concept of image processing.
Figure 6B:
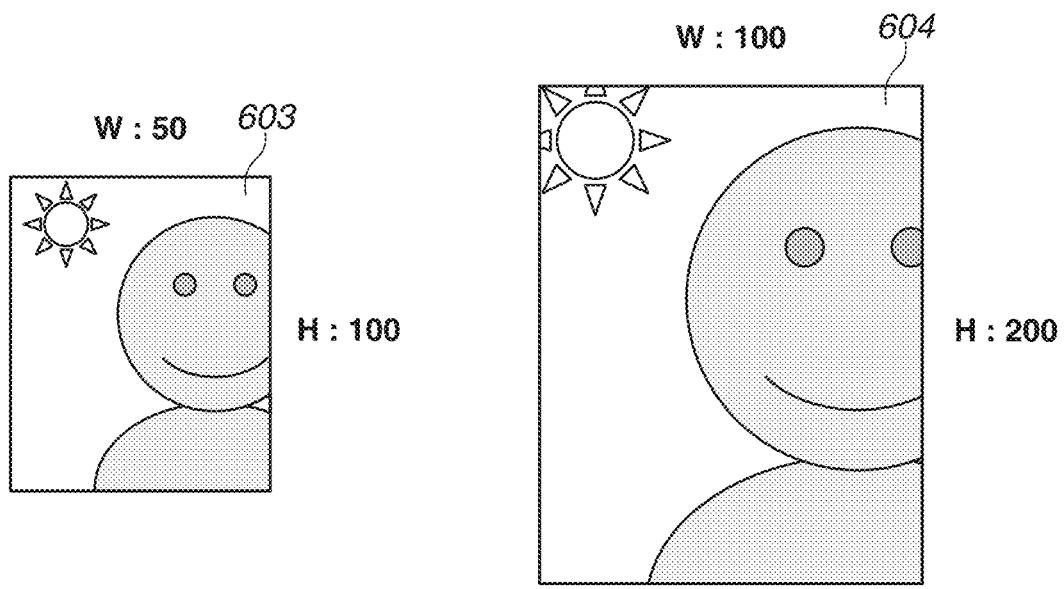

FIGS. 6A and 6B illustrate a concept of image processing. In a case where filter processing such as sharpness processing, print optimization processing, and print optimization enhanced processing is applied to image data, pixels in an edge portion of the image data are deleted, and thus the image data becomes slightly smaller. Respective image data 601 and image data 602 conceptually express a size of the image data before being applied with the filter processing and a size of the image data after being applied with the filter processing. The number of pixels increased or decreased by each filter processing may be arbitrarily changed according to a content of each filter processing, capability information about the printer 105 which executes printing, and the like. According to the present exemplary embodiment, the number of pixels increased or decreased by each filter processing is determined by values selected in the printer selection pull-down 204, the sheet size selection pull-down 205, and the sheet type selection pull-down 206. Further, image data becomes smaller according to a reduction ratio in a case where reduction processing is executed.

On the other hand, image data becomes larger according to an enlargement ratio in a case where enlargement processing is executed. Respective image data 603 and image data 604 conceptually express a size of the image data before being applied with the enlargement processing and a size of the image data after being applied with the enlargement processing.

Figure 7:
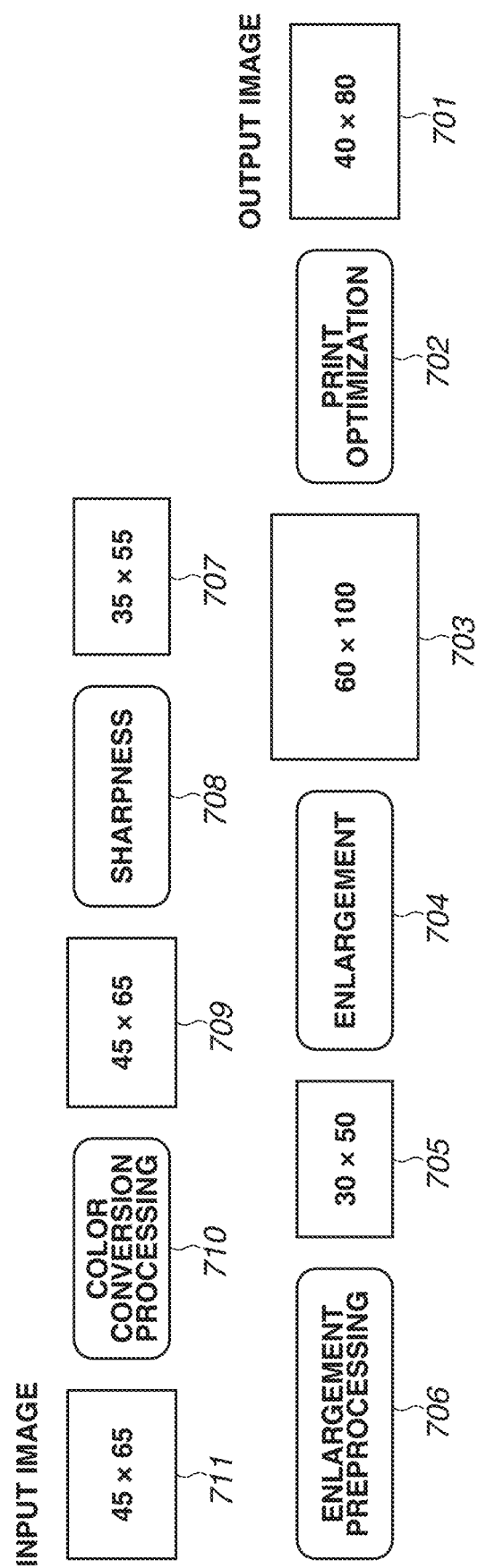
FIG. 7 is a flowchart illustrating processing for determining a size of a divided image to be requested to an image obtainment destination based on an order and a content of image processing.

A size of image data increased or decreased by filter processing, reduction processing, and enlargement processing can be calculated based on contents of the filter processing, the reduction processing, and the enlargement processing. A size of image data that changes by image processing will be described in detail below with reference to FIG. 7. For example, it is assumed that image processing is executed on image data received from the image data supply source in order of color conversion processing, sharpness processing, enlargement processing, and print optimization processing. In addition, the size specified in step S402 is 40 pixels*80 pixels as indicated in an output image 701 which represents image data to be transmitted to the area B.

The image processing to be applied to the output image 701 last is print optimization processing 702. The print optimization processing 702 is processing for filtering a specific amount (20 pixels*20 pixels in this case) of image data from a periphery of the image data. The CPU 108 specifies a size of image data 703 before the print optimization processing (60 pixels*100 pixels in this case) in consideration of the above-described processing. The portion to be filtered by the print optimization processing is an area referred to as a marginal area. The CPU 108 also specifies the marginal area in the image data 703. Specifically, the CPU 108 specifies an area having a 10 pixel width from four sides of the image data 703 in the image data 703 as a marginal area.

The image processing applied before the print optimization processing 702 is enlargement processing 704 for enlarging a size of the image data stored in the image data supply source to a print size. In other words, an enlargement ratio at that time is "the print size/the size of image data stored in the image data supply source". The CPU 108 specifies a size of image data 705 before the enlargement processing (30 pixels*50 pixels in this case) in consideration of the enlargement ratio. At that time, the marginal area is an area having a 5 pixel width from four sides of the image data 705 in the image data 705.

The image processing applied before the enlargement processing 704 is enlargement preprocessing 706 for trimming the periphery of the image data. The enlargement preprocessing 706 is processing for filtering a specific amount (5 pixels*5 pixels in this case) of the image data from the periphery of the image data. The CPU 108 specifies a size of image data 707 before the enlargement preprocessing (35 pixels*55 pixels in this case) in consideration of the above-described processing. The portion to be filtered by the enlargement preprocessing is also the marginal area. Therefore, the CPU 108 specifies an area having a 10 pixel width from four sides of the image data 707 in the image data 707 as the marginal area.

The image processing applied before the enlargement preprocessing 706 is sharpness processing 708. The sharpness processing 708 is processing for filtering a specific amount (10 pixels*10 pixels in this case) of the image data from the periphery of the image data. The CPU 108 specifies a size of image data 709 before the sharpness processing (45 pixels*65 pixels in this case) in consideration of the above-described processing. The portion to be filtered by the sharpness processing is also the marginal area. Therefore, the CPU 108 specifies an area having a 20 pixel width from four sides of the image data 709 in the image data 709 as the marginal area.

The image processing applied before the sharpness processing 708 is color conversion processing 710. In the color conversion processing 710, filtering is not performed. Therefore, the CPU 108 specifies a size of image data 711 before the color conversion processing (45 pixels*65 pixels in this case).

In a case where there is image data corresponding to the marginal area in an area outside of the target band, the CPU 108 requests image data having a size including the marginal area from the image data supply source. On the other hand, in a case where there is no image data corresponding to the marginal area in the area outside of the target band, the CPU 108 requests image data having a size not including the marginal area from the image data supply source. According to the present exemplary embodiment, the target band includes all of the widths of the image data, so that there is no image data corresponding to right and left margin portions in the area outside of the target band. Further, there is no image data corresponding to an upper marginal area of the divided image data to be requested at the very beginning in the area outside the target band and no image data corresponding to a lower marginal area of the divided image data to be requested at the very end in the area outside the target band.

Therefore, according to the present exemplary embodiment, a size of the image data to be requested to the image data supply source first is specified as a size not including the left, right, and upper marginal areas (35 pixels*45 pixels in this case). Further, a size of the image data to be requested to the image data supply source except for the first time and the last time is specified as a size not including the left and right marginal areas (45 pixels*45 pixels in this case). Furthermore, the size of the image data to be requested to the image data supply source last is specified as a size including only the upper marginal area in image data which is not yet obtained.

As described above, the number of pixels (a size) of divided image data to be requested to the image data supply source changes according to a position of the divided image data to be requested to the image data supply source.

The example is described above in which the image processing is executed on image data in order of the color conversion processing, the sharpness processing, the enlargement processing, and the print optimization processing. However, types and numbers of the image processing to be applied may be different according to input to the setting screens illustrated in FIGS. 2A and 2B. According to the present exemplary embodiment, a size of the image data before being applied with the image processing is different according to types and numbers of the image processing to be applied, so that a size of image data before being applied with the image processing in another example may be different from the size of the image data in the above-described example.

Figure 5:
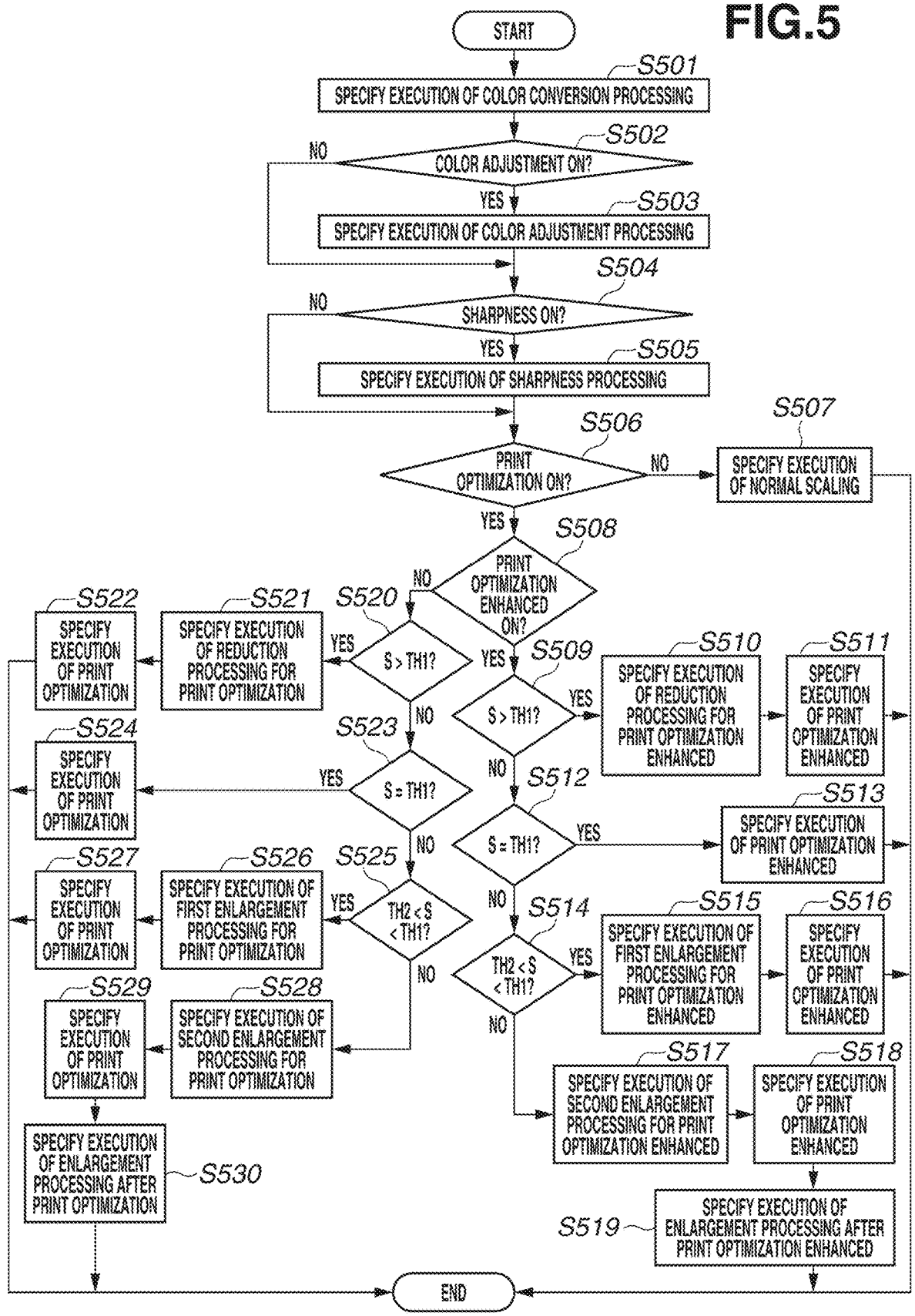
FIG. 5 is a flowchart illustrating processing for specifying a type of image processing applied to image data to be obtained from the image data supply source.

FIG. 5 is a flowchart illustrating processing for specifying a type of the image processing applied to the image data obtained from the image data supply source. Processing in the flowchart illustrated in FIG. 5 is realized by, for example, the CPU 108 reading a program corresponding to the print application 111 stored in the ROM 110 to the RAM 109 and executing the program. The processing in the flowchart illustrated in FIG. 5 corresponds to the processing in step S401.

In step S501, the CPU 108 specifies execution of the color conversion processing. Execution of the color conversion processing is specified without fail regardless of input to the setting screens illustrated in FIGS. 2A and 2B.

In step S502, the CPU 108 determines whether an execution instruction of color adjustment processing is input on the setting screens illustrated in FIGS. 2A and 2B. If determined YES in step S502, the CPU 108 advances the processing to step S503, and if determined NO in step S502), the CPU 108 advances the processing to step S504.

In step S503, the CPU 108 specifies execution of the color adjustment processing.

In step S504, the CPU 108 determines whether an execution instruction of the sharpness processing is input on the setting screens illustrated in FIGS. 2A and 2B. If determined YES in step S504, the CPU 108 advances the processing to step S505, and if determined NO in step S504, the CPU 108 advances the processing to step S506.

In step S505, the CPU 108 specifies execution of the sharpness processing.

In step S506, the CPU 108 determines whether an execution instruction of either of the print optimization processing and the print optimization enhanced processing is input on the setting screens illustrated in FIGS. 2A and 2B. In a case of YES determination (YES in step S506), the CPU 108 advances the processing to step S508, and in a case of NO determination (NO in step S506), the CPU 108 advances the processing to step S507.

In step S507, the CPU 108 specifies execution of normal scaling processing. Subsequently, the CPU 108 terminates the processing.

In step S508, the CPU 108 determines whether an execution instruction of the print optimization enhanced processing is input. If determined YES in step S508, the CPU 108 advances the processing to step S509, and if determined NO in step S508, the CPU 108 advances the processing to step S520.

In step S509, the CPU 108 determines whether a size S of entire image data corresponding to the target image data (in other words, entire image data corresponding to the thumbnail image displayed in the preview area 202) is larger than a threshold value TH1. The threshold value TH1 is a size used for the print optimization enhanced processing. In a case of YES determination (YES in step S509), the CPU 108 advances the processing to step S510, and in a case of NO determination (NO in step S509), the CPU 108 advances the processing to step S512.

In step S510, the CPU 108 specifies execution of reduction processing for the print optimization enhanced processing.

In step S511, the CPU 108 specifies execution of the print optimization enhanced processing. Subsequently, the CPU 108 terminates the processing.

Processing in step S512, which is executed in a case where the determination is NO in step S509, will be described. In step S512, the CPU 108 determines whether the size S is equal to the threshold value TH1. If determined YES in step S512, the CPU 108 advances the processing to step S513, and if determined NO in step S512, the CPU 108 advances the processing to step S514.

In step S513, the CPU 108 specifies execution of the print optimization enhanced processing. In other words, scaling processing is not executed for the print optimization enhanced processing in this case. Subsequently, the CPU 108 terminates the processing.

Processing in step S514, which is executed in a case where the determination is NO in step S512, will be described. In step S514, the CPU 108 determines whether the size S is smaller than the threshold value TH1 and larger than a threshold value TH2. As described above, in a case where the size of the image data before being applied with the image processing is too small, the enlargement ratio for enlarging the image data to a size appropriate for executing the print optimization enhanced processing becomes too large, and an image quality is deteriorated. Therefore, in a case where the size of the image data before being applied with the image processing is too small, the enlargement processing is executed at two separate times. The present processing is processing for determining whether the size of the image data before being applied with the image processing is small to an extent the enlargement processing is to be executed at two separate times. If determined YES in step S514, the CPU 108 advances the processing to step S515, and if NO in step S514, the CPU 108 advances the processing to step S517.

In step S515, the CPU 108 specifies execution of first enlargement processing for the print optimization enhanced processing.

In step S516, the CPU 108 specifies execution of the print optimization enhanced processing. Subsequently, the CPU 108 terminates the processing.

Processing in step S517, which is executed in a case where the determination is NO in step S514, will be described. In step S517, the CPU 108 specifies execution of second enlargement processing for the print optimization enhanced processing.

In step S518, the CPU 108 specifies execution of the print optimization enhanced processing.

In step S519, the CPU 108 specifies execution of the enlargement processing after the print optimization enhanced processing. As described above, the CPU 108 executes the enlargement processing at two separate times in this case so that the print optimization enhanced processing can be executed while suppressing deterioration of the image quality. Subsequently, the CPU 108 terminates the processing.

Processing in step S520, which is executed in a case where the determination is NO in step S514, will be described. In step S520, the CPU 108 determines whether the size S is larger than the threshold value TH1. If determined YES in step S520, the CPU 108 advances the processing to step S521, and if determined NO in step S520, the CPU 108 advances the processing to step S523.

In step S521, the CPU 108 specifies execution of reduction processing for the print optimization processing.

In step S522, the CPU 108 specifies execution of the print optimization processing. Subsequently, the CPU 108 terminates the processing.

Processing in step S523, which is executed in a case where the determination is NO in step S520 will be described. In step S523, the CPU 108 determines whether the size S is equal to the threshold value TH1. If determined YES in step S523, the CPU 108 advances the processing to step S524, and if determined NO in step S523, the CPU 108 advances the processing to step S525.

In step S524, the CPU 108 specifies execution of the print optimization processing. In other words, scaling processing is not executed for the print optimization processing in this case. Subsequently, the CPU 108 terminates the processing.

Processing in step S525, which is executed in a case where the determination is NO in step S523, will be described. In step S525, the CPU 108 determines whether the size S is smaller than the threshold value TH1 and larger than the threshold value TH2. In a case of YES determination (YES in step S525), the CPU 108 advances the processing to step S526, and in a case of NO determination (NO in step S525), the CPU 108 advances the processing to step S528.

In step S526, the CPU 108 specifies execution of the first enlargement processing for the print optimization processing.

In step S527, the CPU 108 specifies execution of the print optimization processing. Subsequently, the CPU 108 terminates the processing.

Processing in step S528, which is executed in a case where the determination is NO in step S528, will be described. In step S528, the CPU 108 specifies execution of the second enlargement processing for the print optimization processing.

In step S529, the CPU 108 specifies execution of the print optimization processing.

In step S530, the CPU 108 specifies execution of the enlargement processing after the print optimization processing. As described above, the CPU 108 executes the enlargement processing at two separate times in this case and thus can execute the print optimization processing while suppressing deterioration of the image quality. Subsequently, the CPU 108 terminates the processing.

As described above, according to the present exemplary embodiment, a size of divided image data to be requested to an image data supply source is calculated backward based on a size corresponding to a capacity of image data which can be stored in the area B and a content of image processing to be applied. According to this configuration, image data having a size which can fit into the area B after being applied with image processing can be obtained from the image data supply source.

The configuration is described above in which the print application 111 obtains image data divided by another program (the image data generation application and the OS), but the present exemplary embodiment is not limited to this configuration. For example, the print application 111 may obtain divided image data by collectively obtaining entire image data of an output target from the another program (the image data generation application and the OS) and then dividing the image data into a specific size by the print application 111.

Further, in the above description, the print application 111 specifies a pixel size based on a memory capacity of the area B and a content of image processing to be applied to the image data supply source and obtains divided image data having the specified pixel size. However, the present exemplary embodiment is not limited to this configuration. For example, the print application 111 may specify a data capacity (a data size) based on the memory capacity of the area B and the content of image processing to be applied with respect to the another program and obtain divided image data having the specified data capacity.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-164580, filed Sep. 3, 2018, which is hereby incorporated by reference herein in its entirety.

What is claimed is:

1. A method for controlling an apparatus including a first memory area and a second memory area, the method comprising:

specifying a first band from output target image data including an area corresponding to predetermined image data and an area corresponding to a margin;

obtaining first divided image data corresponding to an area including at least an area corresponding to the predetermined image data in the specified first band and an area corresponding to the predetermined image data in a second band different from the first band in the output target image data, and having a predetermined size based on a memory capacity of the second memory area and a content of one or plurality of types of image processing including filter processing to delete a part of image-processing-target image to be applied in the first memory area;

applying, in the first memory area, the one or plurality of types of image processing to the obtained first divided image data;

storing the first divided image data applied with the one or plurality of types of image processing in the second memory area; and performing output based on the first divided image data stored in the second memory area.

2. The method according to claim 1, further comprising:

specifying a size of the first band based on the memory capacity of the second memory area, wherein the predetermined size is specified based on the size of the area corresponding to the predetermined image data included in the specified first band and the content of the one or plurality of types of image processing.

3. The method according to claim 2, wherein, in a case where the one or plurality of types of image processing is applied, the predetermined size is specified based on a size of image data which is a size of an area corresponding to the predetermined image data included in the specified first band.

4. The method according to claim 3, wherein the predetermined size is a size of image data including left and right marginal areas to be filtered by the one or plurality of types of image processing.

5. The method according to claim 3, wherein the predetermined size is a size of image data including left, right, and upper marginal areas to be filtered by the one or plurality of types of image processing.

6. The method according to claim 2, further comprising:

in a case where the first band includes an area corresponding to the predetermined image data and an area corresponding to other image data different from the predetermined image data obtaining second divided image data corresponding to an area including at least an area corresponding to the other image data in the specified first band and an area corresponding to the other image data in the second band, and having a size based on the memory capacity of the second memory area and the content of the one or plurality of types of image processing to be applied in the first memory area;

applying the one or plurality of types of image processing to the obtained second divided image data in the first memory area; and storing the second divided image data applied with the one or plurality of types of image processing in the second memory area, wherein output is performed based on the first divided image data and the second divided image data stored in the second memory area.

7. The method according to claim 1, further comprising deleting data stored in the second memory area after output based on the image data is performed.

8. The method according to claim 1, further comprising receiving input for determining which image processing is to be applied to the first divided image data from a user, wherein one or a plurality of types of image processing based on the input is specified as the one or plurality of types of image processing applied in the first memory area.

9. The method according to claim 1, further comprising converting the image data stored in the second memory area into raster data, wherein output is performed based on the image data converted into the raster data.

10. The method according to claim 1, wherein the one or plurality of types of image processing includes at least one of color conversion processing, color adjustment processing, sharpness processing, and print optimization processing.

11. The method according to claim 1, wherein the first divided image data is obtained by requesting the first divided image data from a predetermined supply source which stores the predetermined image data therein.

12. The method according to claim 11, wherein the predetermined supply source is a program different from a program requesting the first divided image data.

13. The method according to claim 1, wherein the first memory area and the second memory area are areas in a same memory.

14. The method according to claim 1, wherein the output is data transmission to a printing apparatus, and wherein, in a case where the output is performed, the printing apparatus performs printing based on the first divided image data.

15. The method according to claim 14, wherein the printing apparatus is an apparatus which performs printing on a large-sized recording medium.

16. The method according to claim 14, wherein the printing apparatus is an apparatus which performs printing using an ink-jet method.

17. The method according to claim 1, further comprising:

specifying the second band from the output target image data;

obtaining third divided image data corresponding to an area including at least an area corresponding to the predetermined image data in the specified second band and an area corresponding to the predetermined image data in a third band different from the first band and the second band in the output target image data, and having a predetermined size based on the memory capacity of the second memory area and the content of the one or plurality of types of image to be applied in the first memory area;

applying, in the first memory area, the one or plurality of types of image processing to the obtained third divided image data;

storing the third divided image data applied with the one or plurality of types of image processing in the second memory area; and performing output based on the third divided image data stored in the second memory area.

18. The method according to claim 1, wherein a size of a marginal area other than the area corresponding to the predetermined image data included in the first divided image data is different from a size of a marginal area other than the area corresponding to the predetermined image data included in third divided image data.

19. The method according to claim 18, wherein the first divided image data does not include a upper marginal area of the area corresponding to the predetermined image data and the third divided image data includes the upper marginal area of the area corresponding to the predetermined image data.

20. A storage medium which stores a program causing a computer of an apparatus including a first memory area and a second memory area to execute:

specifying a first band from output target image data including an area corresponding to predetermined image data and an area corresponding to a margin;

obtaining first divided image data corresponding to an area including at least an area corresponding to the predetermined image data in the specified first band and an area corresponding to the predetermined image data in a second band different from the first band in the output target image data, and having a predetermined size based on a memory capacity of the second memory area and a content of one or plurality of types of image processing including filter processing to delete a part of image-processing-target image to be applied in the first memory area;

applying, in the first memory area, the one or plurality of types of image processing to the obtained first divided image data;

storing the first divided image data applied with the one or plurality of types of image processing in the second memory area; and performing output based on the first divided image data stored in the second memory area.

21. An apparatus including a first memory area and a second memory area, the apparatus comprising:

at least one processor that executes a method comprising:

specifying a first band from output target image data including an area corresponding to predetermined image data and an area corresponding to a margin;

obtaining first divided image data corresponding to an area including at least an area corresponding to the predetermined image data in the specified first band and an area corresponding to the predetermined image data in a second band different from the first band in the output target image data, and having a predetermined size based on a memory capacity of the second memory area and a content of one or plurality of types of image processing including filter processing to delete a part of image-processing-target image to be applied in the first memory area;

applying, in the first memory area, the one or plurality of types of image processing to the obtained first divided image data;

storing the first divided image data applied with the one or plurality of types of image processing in the second memory area; and performing output based on the first divided image data stored in the second memory area.

* * * * *